(12) United States Patent
Kepley, Jr. et al.

(10) Patent No.: US 7,290,888 B2
(45) Date of Patent: Nov. 6, 2007

(54) PROJECTION SYSTEM

(75) Inventors: Le Roy Francis Kepley, Jr., Dallas, TX (US); William K King, Carrollton, TX (US); Scott A Herkimer, Dallas, TX (US); Robert Wescomb Jones, Dallas, TX (US)

(73) Assignee: Technological Systems Sales, Inc., Dallas, TX (US)

( * ) Notice: Subject to any disclaimer, the term of this patent is extended or adjusted under 35 U.S.C. 154(b) by 274 days.

(21) Appl. No.: 11/143,053

(22) Filed: Jun. 2, 2005

(65) Prior Publication Data

US 2005/0270497 A1 Dec. 8, 2005

Related U.S. Application Data

(63) Continuation-in-part of application No. 10/847,421, filed on May 17, 2004, now abandoned.

(51) Int. Cl.
G03B 21/14 (2006.01)
G03B 21/26 (2006.01)
G03B 21/56 (2006.01)
F16M 11/05 (2006.01)

(52) U.S. Cl. .................. 353/79; 353/94; 359/443; 348/918

(58) Field of Classification Search ............ 359/443; 353/79, 80, 65, 94; 248/917, 918
See application file for complete search history.

(56) References Cited

U.S. PATENT DOCUMENTS

| | | | | |
|---|---|---|---|---|
| 947,058 | A * | 1/1910 | Duncan .................. | 353/79 |
| 1,840,920 | A * | 1/1932 | Spaulding .............. | 353/79 |
| 5,746,599 | A * | 5/1998 | Lechner ................. | 353/79 |
| 6,540,366 | B2* | 4/2003 | Keenan et al. ......... | 353/79 |

* cited by examiner

Primary Examiner—Christopher Mahoney
(74) Attorney, Agent, or Firm—Howison & Arnott, L.L.P.

(57) ABSTRACT

The projection system includes a plurality of projection apparatus including a frame. The frames of adjacent projection apparatus are interconnected by at least one bracket connected to vertical members of the adjacent projection apparatus. Adjacent projection apparatus define a viewing area defined by the upper members of the frames of the projection apparatus, the lower members of the frames of the projection apparatus and the outer frame edges of each of the adjacent projection apparatus. A viewing screen is disposed over this viewing area.

20 Claims, 11 Drawing Sheets

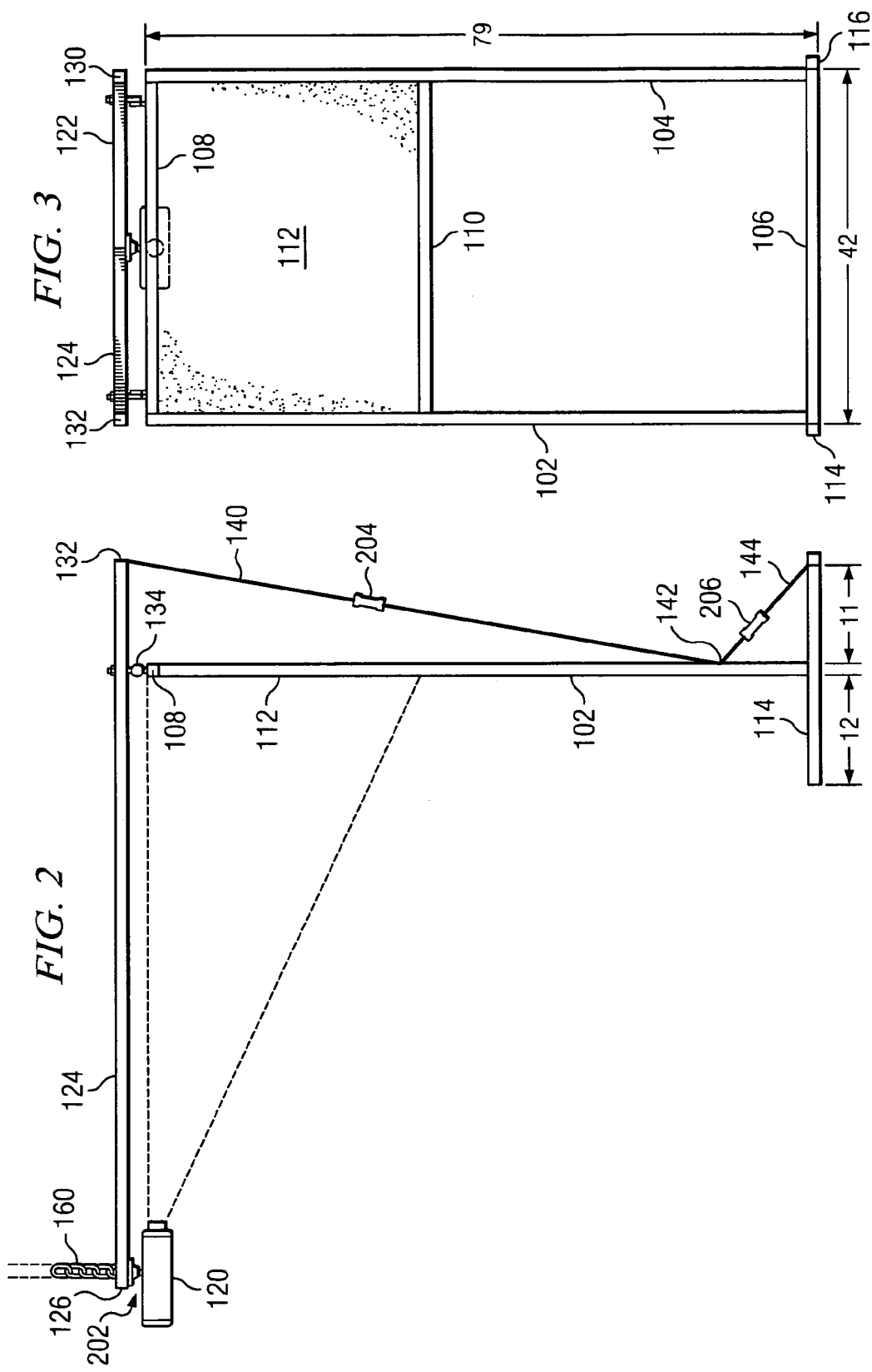

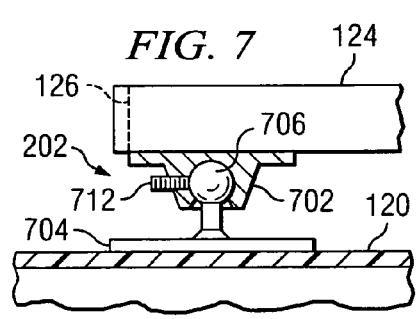
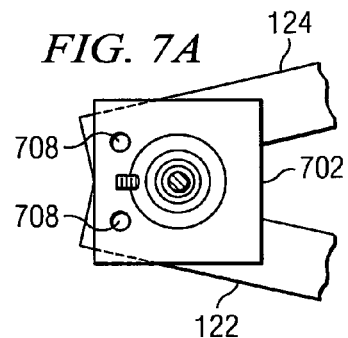
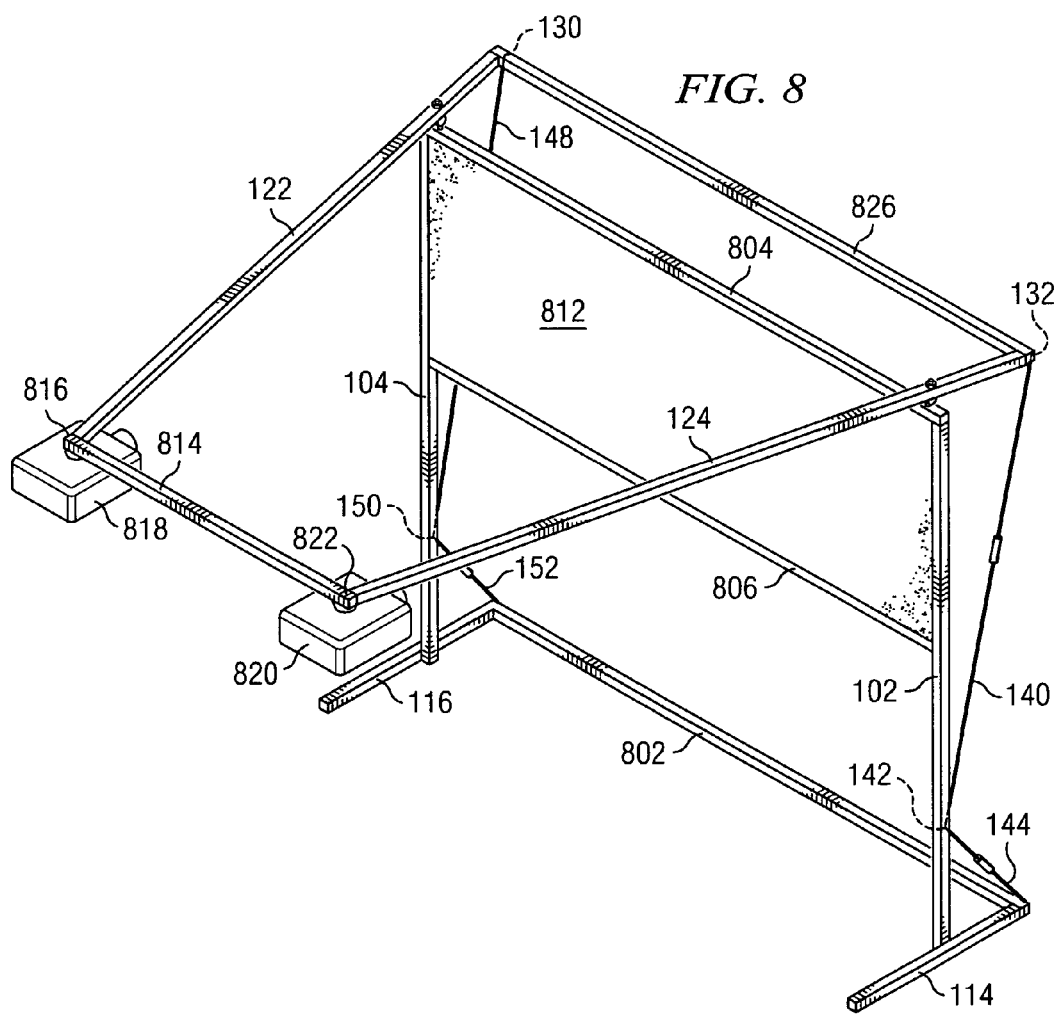

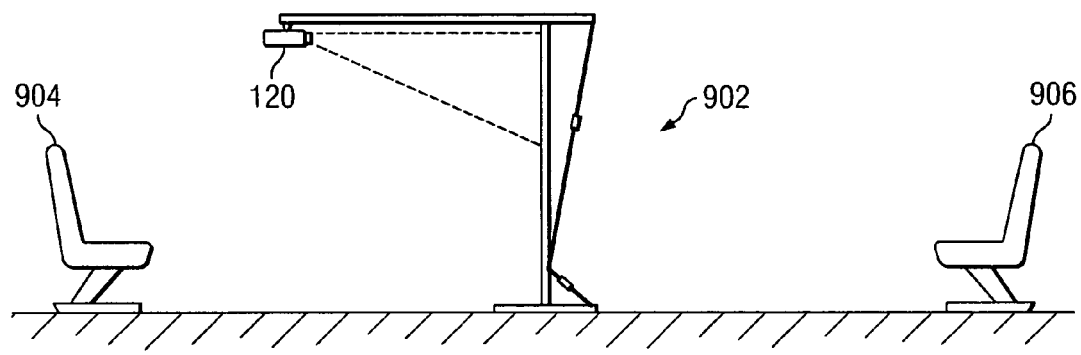
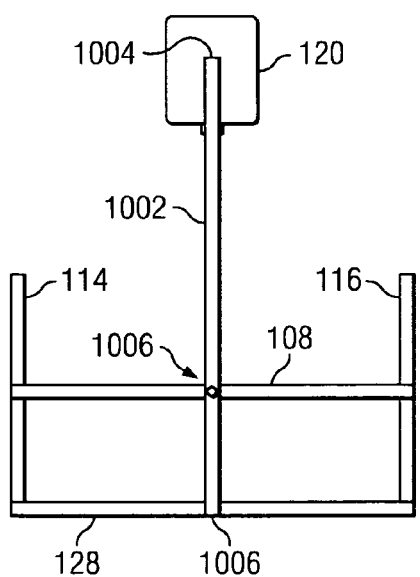
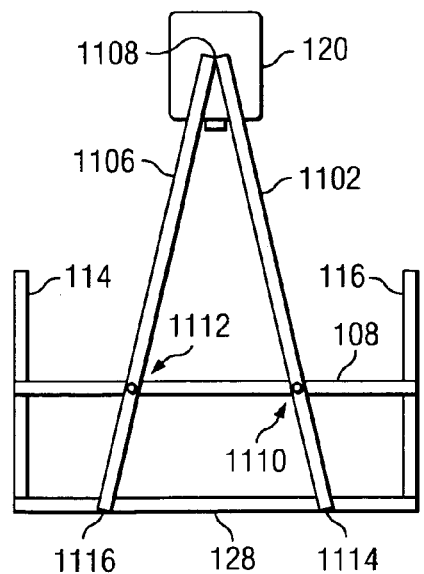

PROJECTION SYSTEM

CROSS REFERENCE TO RELATED APPLICATIONS

This application is a continuation in part of U.S. application Ser. No. 10/847,421, filed May 17, 2004, now abandoned entitled PROJECTION SYSTEM.

TECHNICAL FIELD OF THE INVENTION

The present invention pertains in general to projector systems and, more particularly, to a mounting system for mounting a projector and screen in combination.

BACKGROUND OF THE INVENTION

Audio visual displays typically utilize some type of forward projection system that utilize a liquid crystal display (LCD) or DLP projector that is mounted a predetermined distance away from a screen. This screen can either be reflective for viewing from the same side as the projector or the screen can be somewhat less than opaque such that the projector can be mounted on the rear side of the screen. Typically, these projectors are mounted on some type of mobile caddy that can be disposed in the room. However, such a mounting of the projector utilizes valuable floor space in a viewing room. As such, some of these projectors have been ceiling mounted such that they can be mounted on the ceiling away from the seating area or above the seating area. The problem with this type of mounting is the wiring, the fact that the mounting has to be predefined and the lack of mobility therefor. In some applications, there has been provided a combination of a structure for mounting the projector wherein the screen is part of that structure. However, these types of structures require some type of support for the projector in front or at the rear, in addition to the mounting structure for the screen.

SUMMARY OF THE INVENTION

The present invention disclosed and claimed herein, in one aspect thereof, comprises a projection system including a plurality of projection apparatus having a frame. The frame includes a first vertical member and a second vertical member disposed parallel to the first vertical member. The second vertical member is substantially the same length as the first vertical member. An upper crossbar member is disposed between the first and second vertical members and is perpendicular thereto. An intermediate crossbar member is disposed between the first and second vertical members and is perpendicular to them. A viewing area is defined between the intermediate crossbar member, the upper crossbar member and the first and second vertical members.

A mounting member extends from the upper crossbar member and includes a mounting end disposed forward of the viewing area at a predetermined distance. The mounting member includes a second end extending rearward of the viewing area a predetermined distance. The mounting member is interfaced to the upper crossbar member in a pivotal manner such that the mounting end is disposed along the length of said viewing area at a predetermined length. The projection system further includes at least one bracket for interconnecting the first vertical member of a first projection apparatus to the second vertical member of a second projection apparatus to define a larger viewing area bounded by said first vertical member of said second projection apparatus, said second vertical member of said first projection apparatus, said upper crossbar member of said first and second apparatus and said intermediate crossbar members of said first and second projection apparatus. A viewing screen is disposed over the larger viewing area.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates a side view of the projector mounting system;

FIG. 3 illustrates a rear view of the projector mounting system;

FIG. 7 illustrates a side view of the projector mount;

FIG. 7A illustrates a bottom view of the mounting of the projector;

FIG. 8 illustrates an alternate embodiment of the projector mounting system of the present disclosure;

FIG. 9 illustrates a diagrammatic view of two different uses of the projector mounting system of the present disclosure;

FIG. 10 illustrates an alternate embodiment of the support mechanism for the projector;

FIG. 11 illustrates another embodiment of the support structure for the projector system;

DETAILED DESCRIPTION OF THE INVENTION

Figure 1:
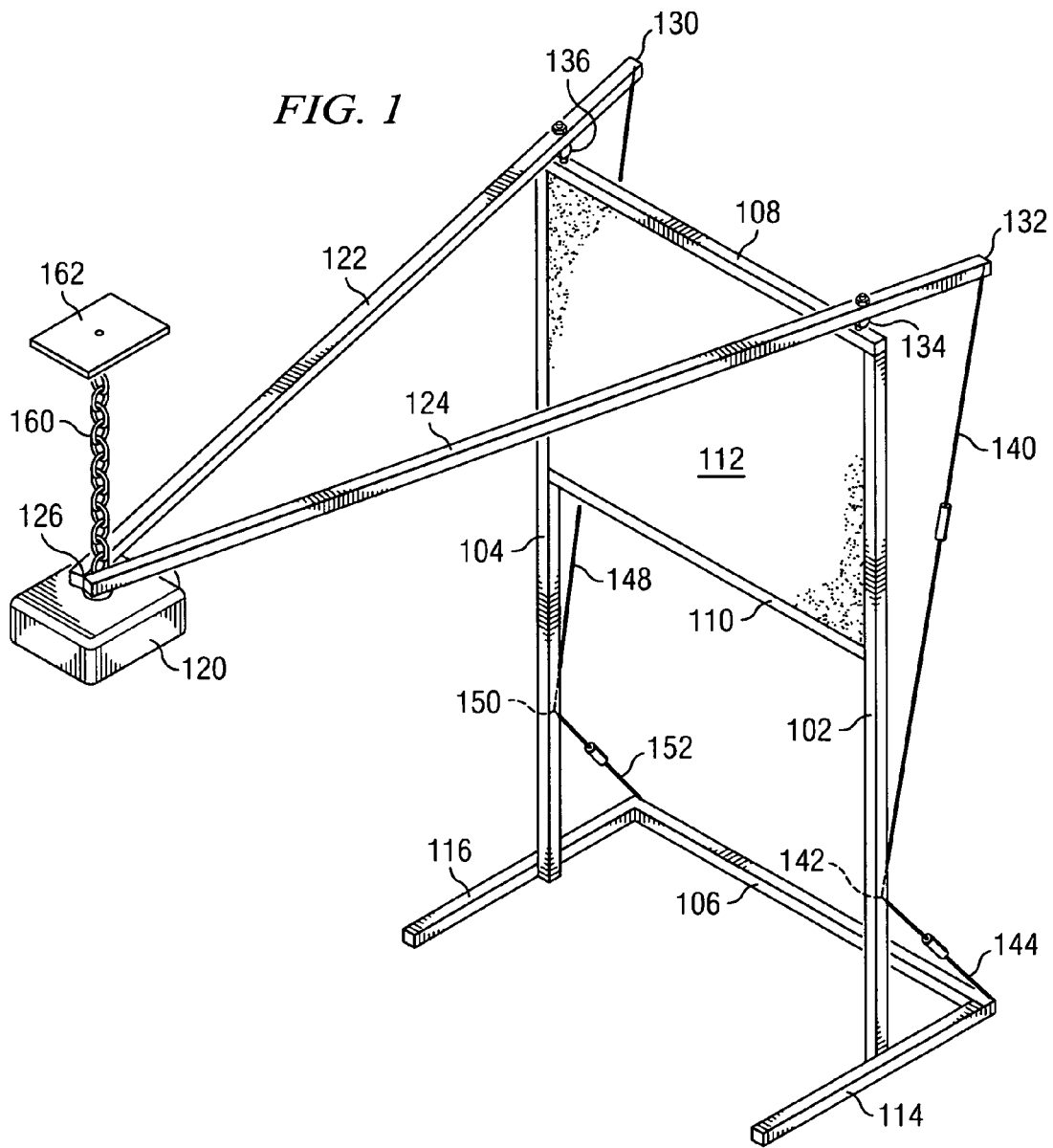
FIG. 1 illustrates a perspective view of the projector mounting system of the present disclosure.

Referring now to FIG. 1, there is illustrated a perspective view of the projector mounting system of the present disclosure. First and second vertical members 102 and 104 are provided which are approximately 79 inches in height and disposed a distance of approximately forty inches apart and extend in a vertical direction from a flat surface. A middle crossbar member 110 is provided for connecting the middle of the two vertical members 104 and 102. A top crossbar member 108 is provided that is disposed across the top of the two vertical members 102 and 104 and is connected thereto. Each of the crossbar members 110 and 108 are approximately 42 inches in length. There is also provided a bottom crossbar member 106 disposed between the two bottom members 116 and 114 at the bottom of the assembly. A counter weight can be added to bottom cross bar member 106 to support the projector stand. A screen 112 is disposed over the area bounded by the two vertical members 102 and 104, the upper crossbar member 108 and the middle crossbar member 110. The screen 112 can either be reflective for front viewing or of an opaqueness to provide for rear viewing, i.e., one can view the image from the opposite side of an image source.

Each of the vertical members 102 and 104, the upper and middle crossbar members 110 and 108 and the bottom crossbar member 106 are fabricated from a one inch extruded aluminum stock that is rectangular. This provides a fairly lightweight structure. To support the structure, there are provided two support arms or leg members 114 and 116 disposed at the bottom of each of the vertical members 102 and 104 and perpendicular to the ends of the bottom crossbar member 106. Each of the leg members 114 and 116 has a dimension of approximately 24 inches in length and is affixed at the center thereof to the ends of the crossbar member 106. Each of the leg members 114 and 116 are fabricated from the same extruded stock of which the members 102 and 104 were fabricated.

A projector 120 is provided as an image source. This projector can be an LCD or DLP projector or any type of image source that can project an image from the front thereof a distance therefrom to a screen and be focused thereon. Any type of such source can be utilized, provided that it is reasonably lightweight and is required to be a predetermined distance from the screen. In the present disclosure, the projector 120 is an LCD or DLP projector that weighs approximately 4 lbs.

A projector mounting structure is provided that is comprised of two longitudinal members 122 and 124 that are joined together at one end to form an apex 126 and which extend outward from the apex 126 in a diverging manner and at an angle to each other, each of the longitudinal members 122 and 124 having a length of approximately ninety inches. Each of the crossbar members 122 and 124 have an end 130 and an end 132, respectively. The longitudinal members 122 and 124 are disposed on the upper surface of the crossbar member 108 such that the crossbar member 124 is interfaced with the crossbar member 108 on the upper surface thereof at a pivot point 134 and the longitudinal member 122 is interfaced with the upper surface of the crossbar member 108 at a pivot point 136. The pivot points 134 and 136 are disposed along the length of longitudinal members 124 and 122 such that the end 132 and the end 130 are both disposed along the perpendicular from the end of the crossbar member 108 a distance of approximately twelve inches.

The end 132 is secured with a cable 140 to a point 142 approximately twelve inches from the crossbar member 106 on the vertical member 102 with the point 142 secured with a cable 144 to the leg member 114 approximately eleven inches from the vertical member 102 and on the same side thereof as the end 132. Similarly, the end 130 is connected with a cable 148 to a point 150 on the rear of the vertical member 104 approximately twelve inches above the end thereof and the point 150 secured with a cable 152 to the end of the leg member 116 approximately twelve inches from the vertical member 104 on the same side as the end 130.

The cables 140 and 148 exert a downward force on the ends 132 and 130, respectively to support the apex 126 holding the projector 120. The projector 120, weighing only approximately 4-8 lbs. and the longitudinal members 122 and 124, being fabricated from the same material as the vertical members 102 and 104 will maintain the center of gravity of the overall structure behind the forward extending ends of the leg members 114 and 116, such that the structure will be self-supporting. This may be achieved by having extension on leg members 114 and 116 to maintain center of gravity or counter weight on member 106, 114 and 116. However to prevent any inadvertent "toppling" of the structure, an additional chain, strap or other connector 160 can be provided at the apex 126 for attachment to an attachment point 162 on the ceiling or some structure above the projector 120. This is for the purpose of preventing the structure from toppling due to external forces, such as an individual bumping into the structure or even external vibrations. This structure is operable to be disposed in a military or tactical situation where it may be disposed proximate to a battlefield. This is a harsh environment that can result in large vibrations from explosions, etc. Although the chain 160 is optional, it can prevent unwanted toppling due to these external forces.

Figure 4:
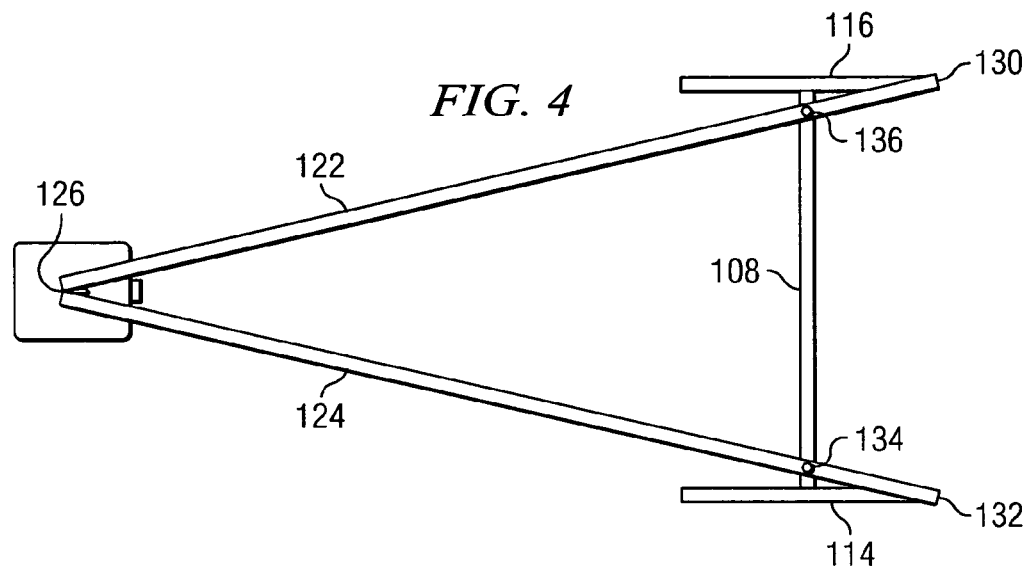
FIG. 4 illustrates a top view of the projector mounting system.

Referring now to FIG. 2, there is illustrated a side view of the projection system of the present disclosure, with FIG. 3 illustrating a rear view thereof and FIG. 4 illustrating a top view thereof. It can be seen in FIG. 2 that the projector is mounted to the apex with a projector mount 202, such that the projector 202 can project an image onto the screen 112. The projector 120 can be tilted with the mount 202 to accurately project the image on the screen 112. The pivot point 134 illustrated in FIG. 2 on one side, is disposed between the longitudinal member 124 and the upper surface of the crossbar member 108. The cable 140 is illustrated as being connected to the point 142 on the vertical member 102 a distance above the lower end thereof. There is provided a turnbuckle 204 on the cable 140 to allow for tensioning thereof and a turnbuckle 206 on the cable 144 for allowing tensioning thereof. However, it could be that an eyelet is provided at the point 142 and the cable 140 and cable 144 are a continuous cable such that only a single turnbuckle would be required. Additionally, the end 132 of longitudinal member 124 could be connected through a cable directly to the end of the leg member 114.

With the configuration illustrated in FIGS. 1-4, it can be seen that a single structure is provided that allows for both forward viewing and rear viewing in a single structure that combines both the screen 112 and the projector 120. Since the ends 130 and 132 with the associated cables 140 and 148 are disposed at the outermost edges of the screen 112, it can be seen that they will not be in the viewing area when viewing the screen from the rear side thereof for a rear projection system. The cable 140 is substantially parallel with the associated vertical member 102. This provides maximum support therefor. Since the end 132 does not extend sufficiently beyond the rearward portion of the leg 114, this allows the structure to be disposed against a back wall with the rear portion of the leg 114 defining the rearmost dimension thereof. As such, as long as the end 132 is disposed away from the vertical member 102 along the perpendicular at a distance equal to or less than the rearward extending portion of the leg 114, this will not interfere with the end 132, i.e., it will not touch the wall that the structure is disposed against.

Figure 5:
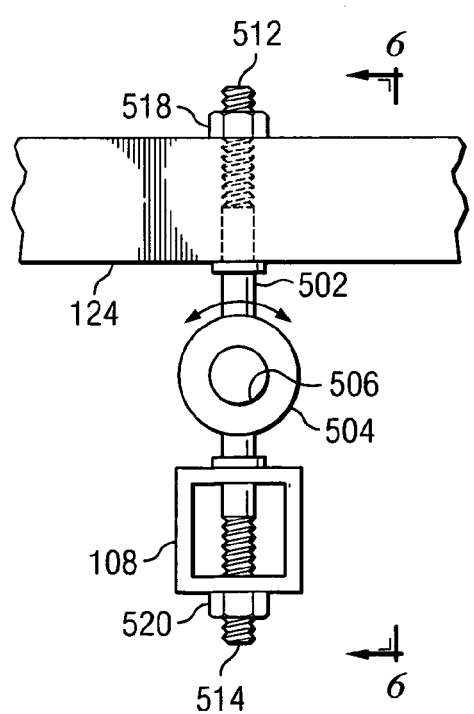
FIGS. 5 and 6 illustrate a detail of the pivoting mechanism.
Figure 6:
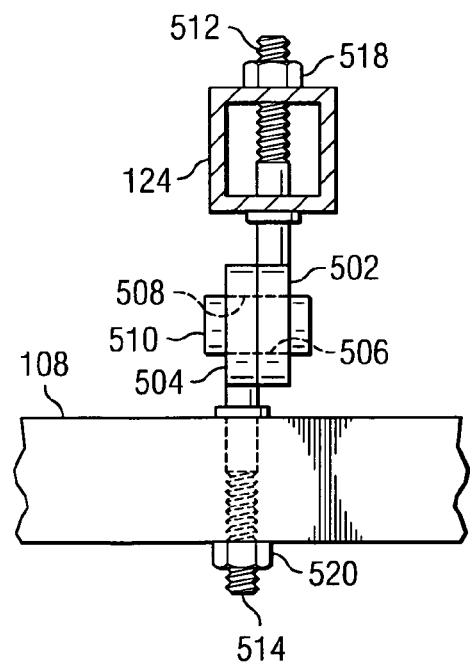

Referring now to FIG. 5, there is illustrated a detailed view of a pivot apparatus that is disposed at the pivot point 134 and at the pivot point 136. The apparatus is that disclosed as disposed at pivot point 134, it being recognized that the same pivot apparatus is disposed at the pivot point 136. FIG. 5 illustrates an end view looking from the end of the crossbar member 108 and FIG. 6 illustrates a view looking from the end view of the longitudinal member 124 in cross section. The pivot apparatus is comprised of first and second eyelet bolts 502 and 504. Each of the eyelet bolts 502 and 504 have a circular end 506 and 508, respectively, for opening therein. The circular sections 506 and 508 are disposed adjacent to each other such that the openings therein line up. A bushing 510 is disposed therebetween which has a generally cylindrical shape with a diameter that is selected to fit within the openings of each of the circular ends 506 and 508. This allows the two circular ends 506 and 508 to rotate relative to each other and in a plane parallel to the openings therein.

Each of the eyelet bolts 502 and 504 has a longitudinal threaded section 512 and 514, respectively, that is oriented such that they extend in opposite directions. The threaded longitudinal end 512 of eyelet bolt 502 extends upwards through a hole in the longitudinal member 124 to the opposite sides thereof to be connected thereto with a bolt 518. Similarly, the longitudinal threaded end of the eyelet bolt 504 extends through a hole in the crossbar member 108 and extends out the other side thereof and is affixed thereto with a bolt 520.

Referring now to FIG. 7, there is illustrated a side view of the projector mount 202 for mounting the projector 120 to the bottom surface of the crossbar members 122 and 124 and FIG. 7A illustrates a bottom view of the mounting of the projector. The projector mount 202 is comprised of an upper securing portion 702 and a lower securing portion 704. The upper portion 702 is comprised of a socket member with the portion 704 having a ball 708 that is disposed within the socket portion. This allows the portion 704 to rotate with respect to the portion 702. A bottom view of the longitudinal members 122 and 124 proximate the apex 126 is illustrated in FIG. 7A. It can be seen that the portion 702 has two or more holes 708 therein for mating with corresponding holes (not shown) in the longitudinal members 122 and 124 such that they can be secured together in a proximate relationship thereto to form the apex 126. With the projector mounting bracket 202, the projector 120 can be tilted at a desired angle. A threaded compression screw 712 is provided that can cause the socket on the member 102 to restrict about the ball 708 to fix the projector 120 at a predetermined angle or position relative to the screen 112.

Referring now to FIG. 8, there is illustrated an alternate embodiment of the disclosed projection system. In the embodiment of FIG. 8, the distance between the two vertical members 102 is increased from a dimension of forty two inches to approximately twice that, or a dimension of eighty four inches. To facilitate this, a bottom crossbar member 802 is disposed between the lower ends of the vertical members 102 and 104, and an upper crossbar member 804 is disposed between the upper ends of the vertical members 102 and 104 and is secured thereto. A center crossbar member 806, similar to the crossbar member 110 is disposed between the center of the two vertical members 102 and 104 at approximately the same distance from the upper crossbar member 804 as was the distance of the crossbar member 110 from the crossbar member 108. A screen 812 is disposed within the region bounded by the upper crossbar member 804, the intermediate crossbar member 806 and the vertical members 102 and 104. This screen is approximately the same height as screen 112 but twice the width thereof.

The longitudinal members 122 and 124 are disposed at approximately the same configuration as those associated with the embodiment of FIG. 1. The difference is that the ends thereof extending outward toward the projection side are separated and are no longer joined at an apex. Rather, the ends of the longitudinal members 122 and 124 extending outward from the projection side are connected together with a crossbar member 814 that has a dimension of approximately forty inches. On an end 816 of the member 122 disposed away from the projection side of the apparatus, there is disposed a first projector 818 mounted on the lower surface thereof with a mounting bracket 202 (not shown). A second projector 820 is disposed on an end 822 of the longitudinal member 124 outward from the projection side of the apparatus. At the opposite end of the longitudinal members 122 and 124, there is disposed a crossbar member 826 that is secured to the ends 130 and 132 of the longitudinal members 122 and 124, respectively.

With the configuration of FIG. 8, it can be seen that two projectors can be utilized to provide a wider viewing area, which wider viewing area can be either forward projection or rear projection. Since the cables 140 and 148 are disposed along and parallel to the longitudinal members 102 and 104, they will not be within the viewing area. Further, the cables 140 and 148 are not outside the plane of the longitudinal members 102 and 104 and the leg members 114 and 116 and, therefore, do not interfere with the apparatus being disposed to the side thereof against a wall. The viewing area will not be impeded in a rear projection viewing orientation, since there is no center support disposed vertically upward between crossbar members 802 and 804.

Referring now to FIG. 9, there is illustrated a side view of a typical viewing for both rear projection and forward projection. The projection apparatus is generally referred to by a reference numeral 902. In one embodiment, a seat 904 is provided, it being understood that there is more than one seat provided, that is disposed on the forward projection side. This will allow a viewer to view the projection screen from the "front" side thereof. For rear viewing, a seat 906 representative of a plurality of seats in the viewing area on the rear side can be provided for viewing the program from the rear side.

Although not illustrated, the projector 120 requires cabling thereto for the purpose of providing for signal delivery thereto. This cabling will be provided with fairly light CAT5 cabling and AC power cabling that will be run along one of the longitudinal members 122 and 124 and down the vertical members 102 or 104. Further, the cabling could be attached thereto and suspended from a ceiling or some other such source. This will provide the video feed to the projector 120.

Referring now to FIG. 10, there is illustrated an alternate embodiment for the support structure for the projector 120. There is provided a single longitudinal member 1002 that replaces the two longitudinal members 122 and 124. This has the projector 120 mounted on a mounting end 1004 with the opposite end, an end 1006, secured to substantially the center of the crossbar member 128. The longitudinal member 1002 is interfaced with the upper crossbar member 108 on a pivot point 1006 with the pivoting apparatus of FIGS. 5 and 6.

Referring now to FIG. 11, there is illustrated an alternate embodiment of the embodiment of FIG. 1 wherein there are provided two longitudinal members 1102 and 1106, similar to the longitudinal members 122 and 124. However, the angle between the two longitudinal members 1102 and 1106 from an apex 1108 adjacent the attachment point to the projector 120 is smaller than that between the longitudinal members 122 and 124. The two longitudinal members 1102 and 1106 will therefore be interfaced with the upper longitudinal member 108 at pivot points 1110 and 1112 that are closer together than the pivot points 134 and 136. The longitudinal members 1102 and 1106 will be attached to the crossbar member 128 at points 1114 and 1116 at the distal ends thereof such that they are disposed a distance from the ends of the crossbar member 128.

Figure 12A:
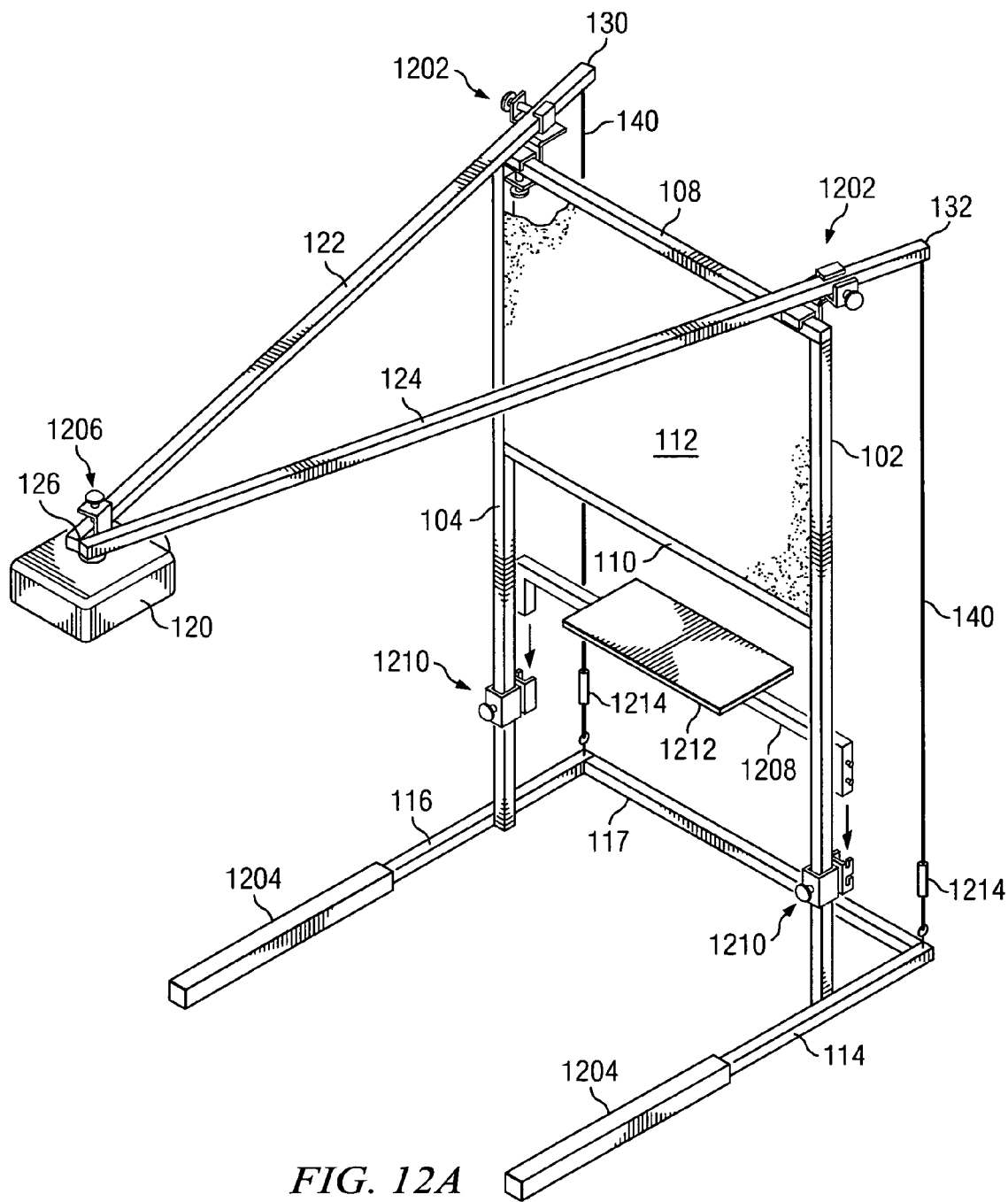
FIG. 12a illustrates an alternate embodiment of the projector mounting system of the present disclosure.

Referring now to FIG. 12, there is illustrated a perspective view of an alternative embodiment of the projector mounting system. Like numbers are used in FIG. 12 for components that are the same as those described with respect to FIG. 1. First and second vertical members 102 and 104 are provided which are approximately 79 inches in height and disposed a distance of approximately 40 to 60 inches apart and extend in a vertical direction from a flat surface. A top crossbar member 108 is provided that is disposed across the top of the two vertical members 102 and 104 and is connected thereto. Crossbar member 108 is approximately 40 to 60 inches in length. There is also a middle crossbar member 110 disposed between the two vertical members 102 and 104 at a distance of approximately 30 to 48 inches from the crossbar member 108. A screen 112 is disposed over the area bounded by the two vertical members 102 and 104, the upper crossbar member 108 and the middle crossbar member 110. The screen 112 can either be reflective for front viewing or of an opaqueness to provide rear viewing, i.e., one can be the image from the opposite side of the image source.

Each of the vertical members 102 and 104, the upper crossbar member 108 and the middle crossbar member 110 are fabricated from one and one-half inch extruded aluminum stock that is rectangular. This provides a fairly lightweight structure. To support the structure, there are provided two support arms or leg members 114 and 116 disposed at the bottom of each of the vertical members 102 and 104. Each of the leg members 114 and 116 has a dimension of approximately 24 inches in length and is affixed at the center thereof to the ends of each of the first and second vertical members 102 and 104. Each of the leg members 114 and 116 are fabricated from the same extruded stock of which members 102 and 104 were fabricated. A cross member 117 connects one end of leg members 114 and 116.

A projector 120 is provided as an image source. This projector can be an LCD or DLP projector or any type of image source that can project an image from the front thereof a distance therefrom to a screen 112 and be focused thereon. Any type of such source can be utilized, provided that it is reasonably lightweight and is required to be a predetermined distance from the screen 112. In the present disclosure, the projector 120 is an LCD or DLP projector that weights approximately four to eight pounds.

A projector mounting structure is provided that is comprised of two longitudinal members 122 and 124 that are joined together at one end to form an apex 126 which extends outward from the apex 126 in a diverging manner and at an angle to each other, each of the longitudinal members 122 and 124 have a length of approximately 90 inches. Each of the crossbar members 122 and 124 have an end 130 and an end 132, respectively. Longitudinal members 122 and 124 are disposed on the upper surface of the crossbar member 108 such that the crossbar member 124 is interfaced with the crossbar member 108 on the upper surface thereof at a bracket 1202 and the longitudinal member 122 is interfaced with the upper surface of the crossbar member 108 at a bracket 1202. The brackets 1202 interconnect the longitudinal members 124 and 122 with the upper crossbar member 108 such that the end 132 and the end 130 are both disposed along the perpendicular from the end of the longitudinal member 124 at a distance of approximately 11 inches.

The end 132 is secured with a cable 140 to an end of the leg members 116 and 114, respectively. The cable 140 may be connected via eye hook connections or any other means for connecting the cable to the members. A turnbuckle 141 enables adjustment of the length of cable 140 and the level of members 122 and 124. The cables 140 exert a downward force on the ends 132 and 130, respectively, to support the apex 126 holding the projector 120. The projector 120 weighs only approximately four to eight pounds. To prevent any inadvertent toppling of the structure, additional support sleeves 1204 may be placed on the ends of leg members 114 and 116. The support sleeves 1204 have a hollow interior of sufficient size to enable the support sleeves 1204 to be slid over the exterior surface of the leg members 114 and 116. The support sleeves 1204 may be telescopically slid along the length of leg members 114 and 116 to provide a larger support base for the projector mounting structure. The projector 120 includes a mounting bracket 1206 enabling the projector 120 to be mounted onto one of the longitudinal members 122 and 124. In the illustration of FIG. 12, the projector 120 is indicated as being mounted upon longitudinal member 122.

Additionally, an adjustable shelf member 1208 may be placed below the screen 112. The adjustable shelf member 1208 is connected between the vertical members 102 and 104 via a pair of sliding brackets 1210. The sliding brackets 1210 enable the adjustable shelf member 1208 to be moved up and down the vertical members 102 and 104. A shelf 1212 is mounted on the shelf member 1208 by a clamp, for example a c-clamp.

Figure 12B:
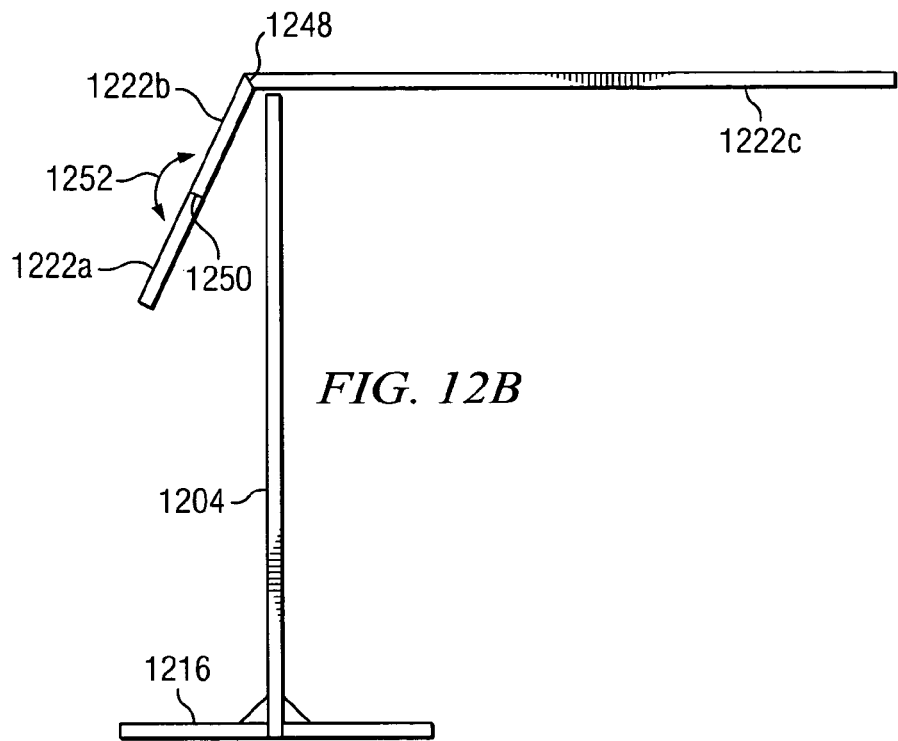
FIG. 12b Illustrates a side view of an alternative embodiment of the projector mounting system.

Referring to FIG. 12*b*, there is illustrated a side view of an alternative embodiment of the projector mounting system. In this embodiment, the vertical member 1204 and leg member 1216 remain the same. However, longitudinal members 1222 and 1224 rather than extending perpendicularly to the side member 1204 behind the projection screen are instead angled downward. The angle between the downward extending portion consisting of members 1222*a* and 1222*b* is at an angle of approximately 65°. Member 1222*a* may fold at hinged point 1250 along line 1252 to lay against member 1222*b* where the system is being broken down for storage or transport. By angling the portion of longitudinal support 1222 behind the screen downward, the structure may be placed closer to a wall.

Figure 12C:
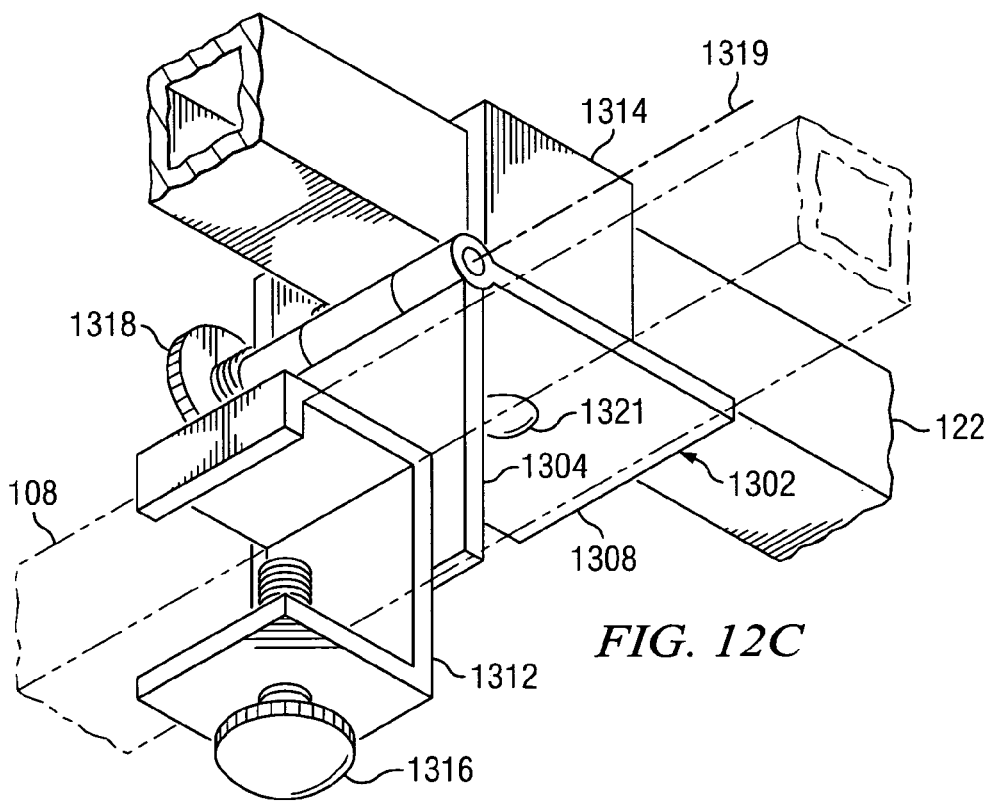
FIG. 12c illustrates a bracket for mounting projector supports to a screen support.
Figure 13:
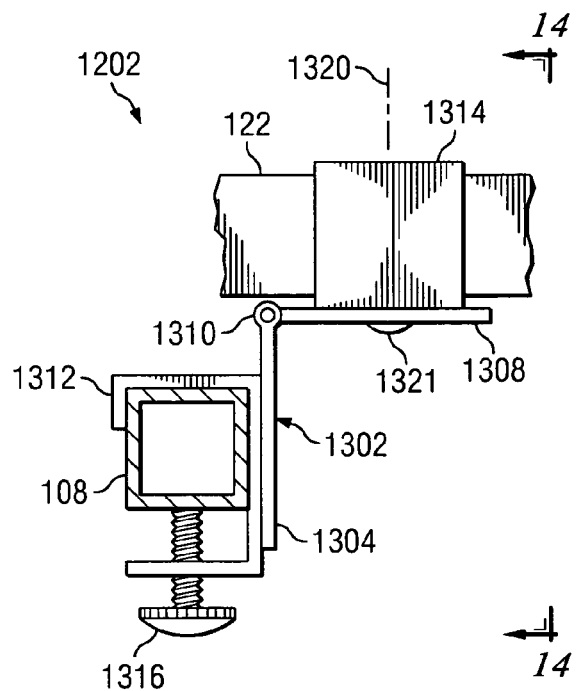
FIGS. 13 and 14 illustrate detail of a bracket for mounting projector supports to a screen support.
Figure 14:
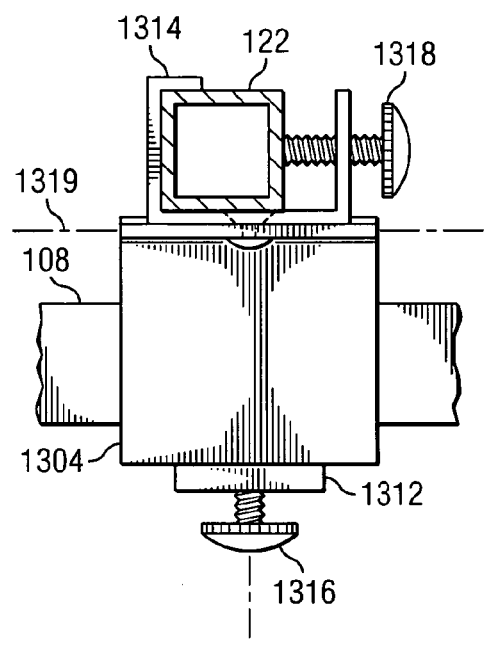

Referring now to FIGS. 12*c*, 13 and 14, there is illustrated the bracket 1202 for interconnecting the longitudinal members 122 and 124 to the top crossbar member 108. The bracket 1202 consists of a hinge 1302 consisting of a first plate 1304, a second plate 1308 and a pivot point 1310. A first C-shaped bracket 1312 is connected to the first plate 1304 and a second C-shaped bracket 1314 is connected to the second plate 1308. The C-shaped bracket 1314 is shaped to receive the longitudinal member 122 and 124 and is locked into place using a threaded screw 1318 passing through C-shaped bracket 1314 to engage a surface of longitudinal member 122. Likewise, C-shaped bracket 1312 is configured to engage the upper crossbar member 108 and is locked into place by a threaded screw 1316 threaded through C-shaped bracket 1312 to engage a surface of member 108. The hinge 1302 enables the longitudinal members 122 and 124 to pivot with respect to the upper crossbar member 108 along line 1319. Thus, the longitudinal members 122 and 124 may be raised and lowered as the structure is assembled and rotation occurs about pivot point 1310. C-shaped hinge 1314 additionally includes a rivet 1321 enabling the C-shaped hinge 1314 to rotate about axis 1320. This enables the C-shaped hinge 1314 to rotate to account for the angle at which the longitudinal members 122 and 124 are positioned with respect to upper crossbar member 108.

Figure 15:
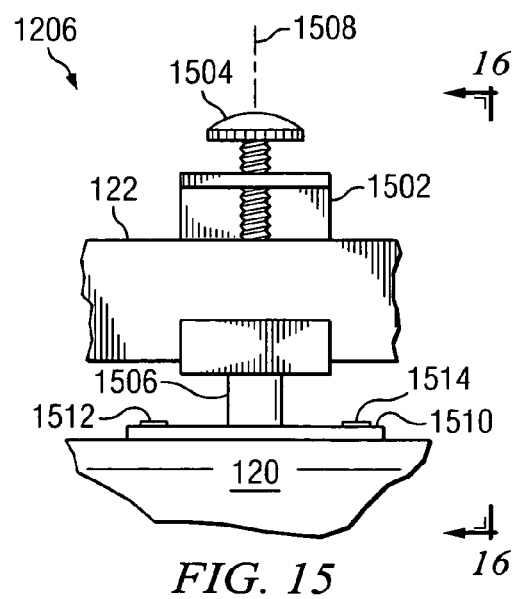
FIGS. 15 and 16 illustrate an alternative embodiment of the projector mount.
Figure 16:
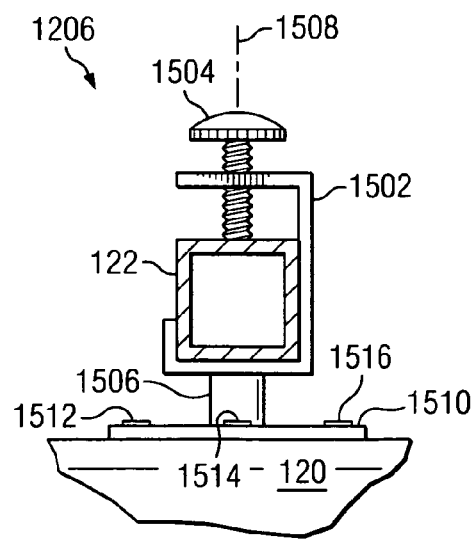

Referring now to FIGS. 15 and 16, there is more fully illustrated the bracket 1206 for mounting the projector 120 to one of the longitudinal members 122 and 124. Again, as with respect to FIGS. 13 and 14, a description will be made with respect to mounting the projector 120 on longitudinal member 122. However, the bracket 1206 is equally able to mount the projector 120 to longitudinal member 124. Bracket 1206 consists of a C-shaped clamp 1502 that is configured to receive one of the longitudinal members 122 or 124. The C-shaped bracket 1502 is securely affixed to the longitudinal member 122 using a threaded screw 1504 that engages a surface of longitudinal member 122 and is threaded through a surface of the C-shaped clamp 1502. A pivoting connection 1506 connects to a bottom surface of the C-shaped clamp 1502 to enable a connected projector 120 to be rotated about an axis 1508. The pivoting connection 1506 also connects with a plate 1510 which may be bolted or affixed to the projector 120 in some manner to enable the projector 120 to be rotated about the axis 1508. Thus, the projector 120 is mounted to the longitudinal members 122 and 124 by merely placing the bracket 1502 around one of these members and affixing it by tightening the screw 1504. The projector 120 may then be connected to plate 1510 and rotated about axis 1508 to be placed in a position to enable the projector to provide the desired image upon screen 112.

Figure 16A:
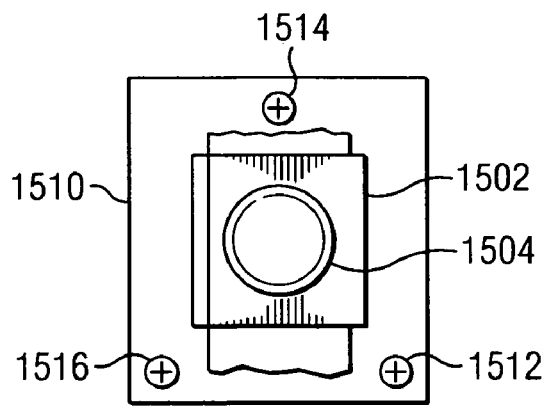
FIG. 16a illustrates a top view of the projector mount.

FIG. 16a illustrates a top view of the projector mounting assembly. Plate 1510, having a size of three and three-fourths inches by four and one-half inches enables a projector to be connected to the projector mounting assembly. The C-shaped clamp 1502 enables the projector assembly to be connected to a longitudinal member 122. Threaded screw 1504 enables the C-shaped clamp to be clamped on the longitudinal member 122. Adjustment bolt 1514 enables the projection level to be adjusted up or down. Thus, the point on the screen at which the projector is projecting an image may be raised or lowered by adjusting bolt 1514. The horizontal level of the picture displayed by the projector on a screen may be controlled by adjusting bolts 1516 and 1512. By adjusting bolts 1516 and 1512 the horizontal level of the picture may be adjusted to raise or lower each edge of a projected image as necessary. Finally, a position of a projected image on the screen may be adjusted to the left and right by adjusting the position of the projector about pivoting connection 1506 below bracket 1502. The projector image may be moved left and right on a screen to center the projected image in a desired manner.

Figure 17:
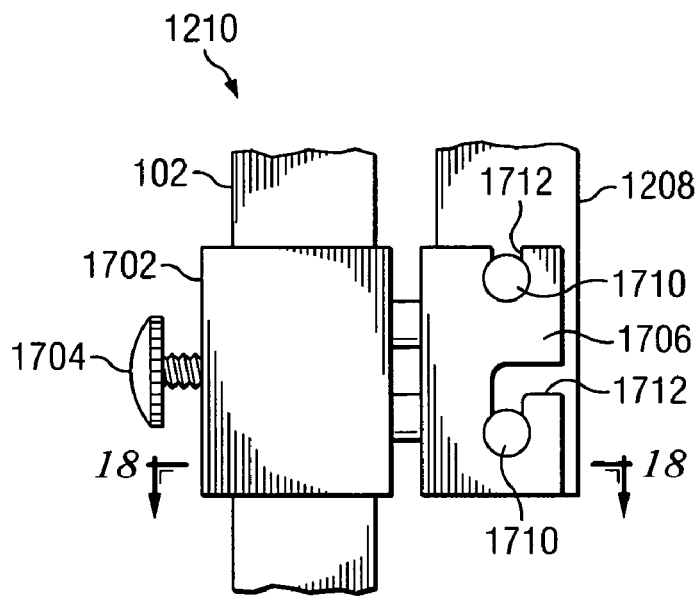
FIGS. 17 and 18 illustrate an adjustable shelf mount bar and bracket.
Figure 18:
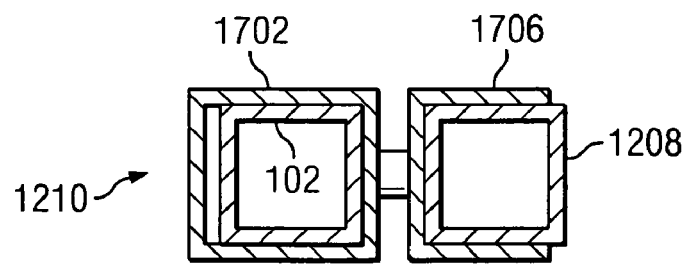

Referring now to FIGS. 17 and 18, there is more fully illustrated the bracket 1210 for supporting the adjustable shelf member 1208. The bracket 1210 for mounting the adjustable shelf member 1208 to the vertical members 102 and 104 consist of a sleeve 1702 which completely surrounds vertical member 102 or 104. The sleeve 1702 may move up and down member 102 by loosening a threaded screw 1704 which passes through a wall of sleeve 1702 to engage a surface of vertical member 102. When the desired position is reached, the screw 1704 may be tightened to affix the sleeve 1702 in a desired position. Connected to sleeve 1702 is bracket 1706. The bracket 1706 has a substantially U-shaped configuration enabling it to receive the adjustable shelf member 1208. The adjustable shelf member 1208 includes a pair of extended protrusions 1710 which are able to engage slots 1712 defined within the bracket 1706. Via the protrusion 1710 and slot 1712 within the bracket 1706, the adjustable shelf member 1208 may be locked into a substantially fixed position. A bracket 1210 is located on each vertical member 102 and 104 to support each side of an adjustable shelf member 1208.

Figure 19:
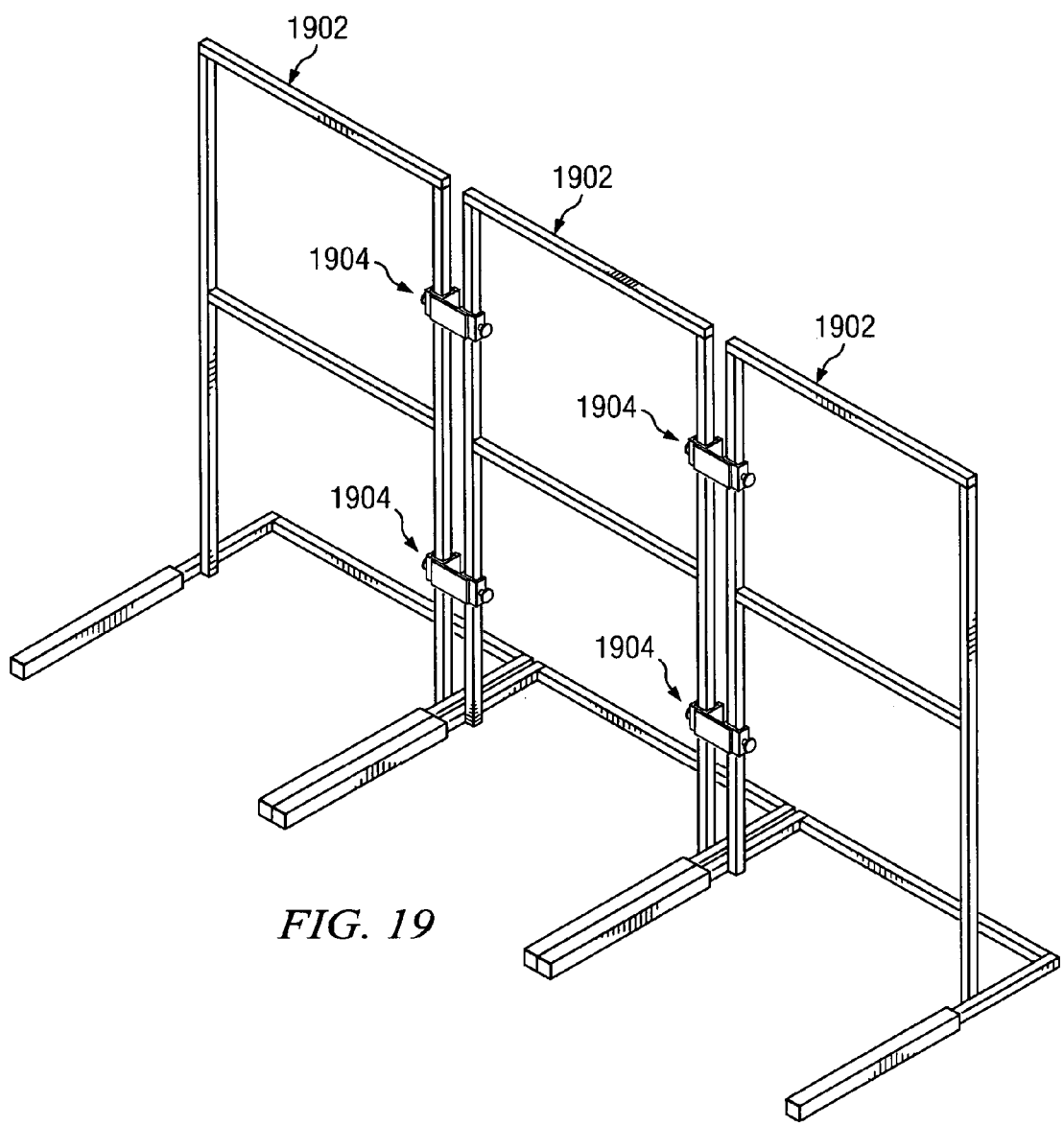
FIG. 19 illustrates a perspective view of a projector mounting system including multiple screens.
Figures 20, 21:
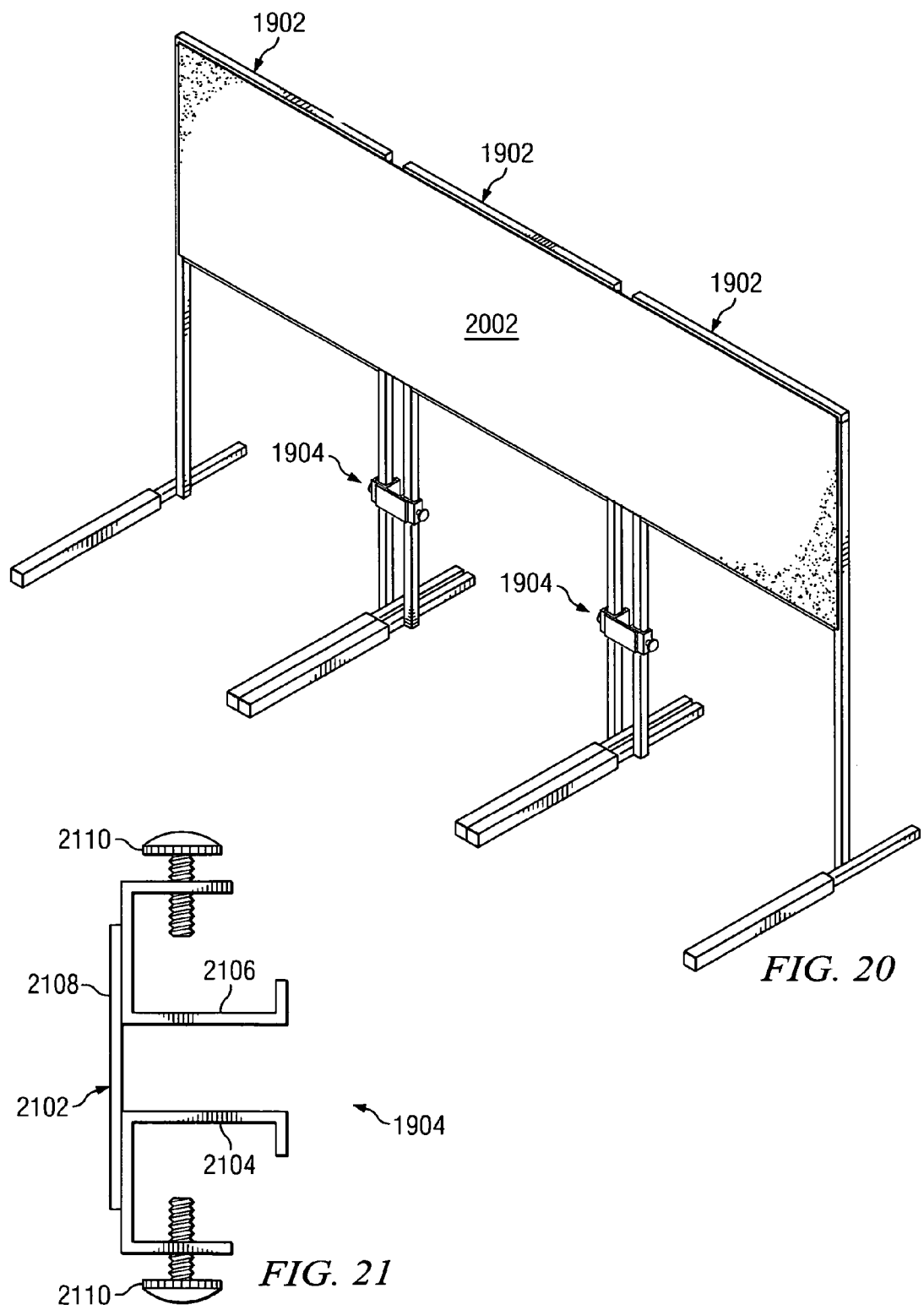
FIG. 20 illustrates a perspective view of multiple screens supporting a single display surface.
FIG. 21 illustrates a top view of a bracket for connecting multiple projector mounting systems together to form a single display surface.

Referring now to FIG. 19, there is illustrated a configuration for interconnecting multiple projector and screen support structures 1902. For purposes of discussion in FIG. 19, only the structure for mounting the screen is shown. However, the projector mounting longitudinal members 122 and 124 will ultimately be mounted on the upper crossbar member 108 as described herein above. Each of the screen structures 1902 are connected together via a series of mounting brackets 1904. The brackets 1904 are affixed to adjacent vertical members 102, 104. This enables the screen structures 1902 to be fixedly connected in close proximity to each other and provide a large display area combining the smaller display areas of each screen structure 1902. The outer edges of the screen structures 1902 include a number of snap connectors 1906. These snap connectors 1906 enable a screen 2002 (see FIG. 20) to be snapped along the top, bottom and side edges defined by the multiple screen support structures 1902. In this manner, multiple screen support structures 1902 may be used to provide one single continuous display screen 1202 as illustrated in FIG. 20. By using the mounting brackets 1204 to hold the screen in a fixed position, the screen is maintained as a single continuous surface. When the projector systems associated with each of the three support structures 1902 are mounted on their top members, the system is able to project three separate images across the provided screen 1202 or alternatively could be configured to provide one single continuous panoramic image across the screen 1202. While the use of three screen structures is illustrated, fewer or more structures 1902 may be used as necessary.

Referring now to FIG. 21, there is more fully illustrated a top view of the mounting bracket 1904 for interconnecting the multiple screen support structures 1902. The mounting bracket 1904 includes a plate 2102 to which a pair of C-shaped brackets 1204 and 1206 are affixed. The plate 2102 has its front surface 2108 positioned such that it will provide a smooth surface for laying the screen 2002 on when the screen is snapped onto the structure provided by the multiple screen supports 1902. The C-shaped brackets 2104 and 2106 are placed around the rectangular vertical members 104, 102 of adjacent screen support structures 1902. They are affixed into position by tightening screws 2110 which are threaded through the surfaces of brackets 2104 and 2106 to engage a surface of the vertical member 102, 104. Likewise, to remove the mounting bracket 1904, the screws 2110 may be loosened such that the brackets can be removed from the vertical members 102, 104.

Although the preferred embodiment has been described in detail, it should be understood that various changes, substitutions and alterations can be made therein without departing from the spirit and scope of the invention as defined by the appended claims.

What is claimed is:

1. A projection system, comprising:
   a plurality projection apparatus including a frame, said frame including:
   a first vertical member;

a second vertical member disposed parallel to said first vertical member, said second vertical member substantially the same length as said first vertical member;

an upper crossbar member disposed between said first and second vertical members perpendicular thereto;

an intermediate crossbar member disposed between said first and second vertical members and perpendicular thereto and below said upper crossbar member to define a viewing area bounded by said first and second vertical members, said upper crossbar member and said intermediate crossbar member; and a mounting member extending over said upper crossbar member and having a mounting end disposed forward of said viewing area a first predetermined distance and a second end extending rearward of said viewing area a second predetermined distance, said mounting member interfaced to said upper crossbar member in a pivotal manner such that said mounting end is disposed along the length of said viewing area at a predetermined length;

at least one bracket for interconnecting the first vertical member of a first projection apparatus to the second vertical member of a second projection apparatus to define a larger viewing area bounded by said first vertical member of said second projection apparatus, said second vertical members of said first projection apparatus, said upper crossbar members of said first and second projection apparatuses and said intermediate crossbar members of said first and second projection apparatuses;

a viewing screen disposed over said larger viewing area.

2. The projection system of claim 1, further including snap connectors on said first vertical member of said second projection apparatus, said second vertical members of said first projection apparatus, said upper crossbar members of said first and second projection apparatuses, said intermediate crossbar members of said first and second projection apparatuses and a periphery of said viewing screen for disposing the viewing screen over said larger viewing area.

3. The projection system of claim 1, wherein the at least one bracket further comprises:
   a base plate;
   a first bracket connected to a first side of the base plate for removably receiving the first vertical member of the second projection apparatus; and
   a second bracket connected to the first side of the base plate for removably receiving the second vertical member of the first projection apparatus.

4. The projection system of claim 3, further including:
   a first adjustable mechanism for securing the first vertical member of the second projection apparatus in the first bracket; and
   a second adjustable mechanism for securing the second vertical member of the first projection apparatus in the second bracket.

5. The projection system of claim 4, wherein the first and second adjustable mechanisms further comprise an adjustable screw.

6. The projection system of claim 1, wherein said interface between said mounting member and said upper crossbar member comprises a removable bracket.

7. The projection system of claim 6, wherein the removable bracket further comprises:
   a first plate;
   a second plate pivotally connected to the first plate;
   a first bracket pivotally connected the first plate for removably receiving the mounting member; and
   a second bracket connected to the second plate for removably receiving the upper crossbar member of the first projection apparatus.

8. The projection system of claim 7, further including:
   a first adjustable mechanism for securing the first vertical member of the second projection apparatus in the first bracket; and
   a second adjustable mechanism for securing the second vertical member of the first projection apparatus in the second bracket.

9. The projection system of claim 8, wherein the first and second adjustable mechanisms further comprise an adjustable screw.

10. The projection system of claim 1, further including an adjustable shelf member disposed between said first and second vertical members and perpendicular thereto, said adjustable shelf member movable to a plurality of positions between the first and second vertical members.

11. The projection system of claim 10, wherein the adjustable shelf member is connected to the first and second vertical members by a sliding bracket.

12. The projection system of claim 11, wherein sliding bracket further comprise:
    a sleeve slidably connected to the first or second vertical member and movable between a plurality of positions on the first or second vertical member;
    a bracket connected to the sleeve for removable receiving the adjustable shelf member.

13. The projection system of claim 12, further including an adjustable mechanism for securing the sleeve to the first or second vertical member at a selected position.

14. The projection system of claim 13, wherein the adjustable mechanism further comprise an adjustable screw.

15. The projection system of claim 13, wherein the adjustable mechanism further comprise an adjustable screw.

16. The projection system of claim 1, wherein a projector is mounted to the mounting member by a mounting bracket, said mounting bracket pivoting to allow adjustment of the angle of said projector relative to said mounting member and removably connected to the mounting member.

17. The projection system of claim 16, wherein the mounting bracket further comprises:
    a base plate for connecting to the projector;
    a clamp for removably receiving the mounting member, wherein the clamp is pivotally connected to the base plate; and
    an adjustable mechanism for securing the clamp to the mounting member.

18. The projection apparatus of claim 1 wherein a projector is disposed on said mounting member at said mounting end.

19. The projection apparatus of claim 1 wherein said mounting member comprises:
    a first longitudinal member having first and second ends;
    a second longitudinal member having first and second ends, said first ends of said first longitudinal member disposed proximate to the first end of said second longitudinal member to form said mounting end of said mounting member;
    the angle between said first and second longitudinal members dimensioned such that the distance between said second ends of said first and second longitudinal member is equal to a greater than the distance between said first and second vertical members; and each of said first and second longitudinal members pivotally interfaced with said upper crossbar member a distance from the second ends thereof.

20. A projection system, comprising:

a plurality projection apparatus including a frame, said frame including:
   a first vertical member;
   a second vertical member disposed parallel to said first vertical member, said second vertical member substantially the same length as said first vertical member;
   an upper crossbar member disposed between said first and second vertical members perpendicular thereto;
   an intermediate crossbar member disposed between said first and second vertical members and perpendicular thereto and below said upper crossbar member to define a viewing area bounded by said first and second vertical members, said upper crossbar member and said intermediate crossbar member; and
   a first longitudinal member having first and second ends;
   a second longitudinal member having first and second ends, said first ends of said first longitudinal member disposed proximate to the first end of said second longitudinal member to form a mounting end;
   the angle between said first and second longitudinal members dimensioned such that the distance between said second ends of said first and second longitudinal member is equal to a greater than the distance between said first and second vertical members; and
   each of said first and second longitudinal members pivotally interfaced with said upper crossbar member a distance from the second ends thereof, said pivotal interface between said first and second longitudinal members and said upper crossbar member including a removable bracket;

at least one bracket for interconnecting the first vertical member of a first projection apparatus to the second vertical member of a second projection apparatus to define a larger viewing area bounded by said first vertical member of said second projection apparatus, said second vertical members of said first projection apparatus, said upper crossbar members of said first and second projection apparatuses and said intermediate crossbar members of said first and second projection apparatuses; and a viewing screen disposed over said larger viewing area.

* * * * *